United States Patent
Yang et al.

(10) Patent No.: US 10,620,480 B2
(45) Date of Patent: Apr. 14, 2020

(54) LIQUID CRYSTAL DISPLAY

(71) Applicant: Samsung Display Co., Ltd., Yongin-si (KR)

(72) Inventors: Gi Hoon Yang, Ansan-si (KR); Duck Jong Suh, Gwangmyeong-si (KR); Ho Lim, Suwon-si (KR); Suk-Kung Chei, Suwon-si (KR); Min-Joo Han, Seoul (KR)

(73) Assignee: SAMSUNG DISPLA CO., LTD., Gyeonggi-Do (KR)

( * ) Notice: Subject to any disclaimer, the term of this patent is extended or adjusted under 35 U.S.C. 154(b) by 239 days.

(21) Appl. No.: 15/805,648

(22) Filed: Nov. 7, 2017

(65) Prior Publication Data
US 2018/0129087 A1 May 10, 2018

(30) Foreign Application Priority Data
Nov. 8, 2016 (KR) ........................ 10-2016-0148050

(51) Int. Cl.
*G02F 1/1337* (2006.01)
*C09K 19/30* (2006.01)
*C08F 122/10* (2006.01)
*C08F 122/20* (2006.01)
*C09K 19/56* (2006.01)
(Continued)

(52) U.S. Cl.
CPC ........ *G02F 1/1337* (2013.01); *C08F 122/105* (2013.01); *C08F 122/20* (2013.01); *C09K 19/3066* (2013.01); *C09K 19/56* (2013.01); *G02F 1/133707* (2013.01); *G02F 1/134309* (2013.01); *C09K 2019/0448* (2013.01);
(Continued)

(58) Field of Classification Search
CPC ............... C08F 122/105; C08F 122/20; C09K 19/3066; C09K 19/56; C09K 2019/0448; G02F 1/1337; G02F 1/133707; G02F 1/134309; G02F 2001/133776; Y10T 428/1005
USPC .......................................................... 428/1.2
See application file for complete search history.

(56) References Cited

U.S. PATENT DOCUMENTS

2013/0314655 A1 11/2013 Archetti et al.
2014/0138581 A1 5/2014 Archetti et al.

FOREIGN PATENT DOCUMENTS

KR 100654270 B1 11/2006
KR 1020130091212 A 8/2013
(Continued)

*Primary Examiner* — Sophie Hon
(74) *Attorney, Agent, or Firm* — Cantor Colburn LLP

(57) ABSTRACT

A liquid crystal display includes: a first substrate; a second substrate overlapping the first substrate; a liquid crystal layer between the first substrate and the second substrate and including liquid crystal molecules; and a plurality of protrusions between the first substrate and the liquid crystal layer, between the second substrate and the liquid crystal layer, or a combination thereof, wherein the plurality of protrusions includes a polymer of a compound represented by Formula 1.

Formula 1

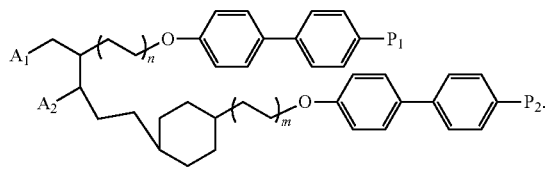

12 Claims, 6 Drawing Sheets

(51) Int. Cl.
*G02F 1/1343* (2006.01)
*C09K 19/04* (2006.01)
(52) U.S. Cl.
CPC ............ *G02F 2001/133776* (2013.01); *Y10T 428/1005* (2015.01)

(56) References Cited

FOREIGN PATENT DOCUMENTS

| KR | 1020140045535 A | 4/2014 |
| KR | 1020140047589 A | 4/2014 |
| KR | 101618785 B1 | 4/2016 |
| WO | 2013004372 A1 | 1/2013 |

LIQUID CRYSTAL DISPLAY

This application claims priority to and the benefit of Korean Patent Application No. 10-2016-0148050 filed in the Korean Intellectual Property Office on Nov. 8, 2016, and all the benefits accruing therefrom under 35 U.S.C. § 119, the entire content of which in its entirety is incorporated herein by reference.

BACKGROUND

(a) Technical Field

The present disclosure relates to a liquid crystal display.

(b) Description of the Related Art

The liquid crystal display includes a liquid crystal layer on which an electric field, generated by a field generating electrode such as a pixel electrode and a common electrode, is formed. The liquid crystal display forms an electric field on the liquid crystal layer to determine a direction of liquid crystal molecules in the liquid crystal layer, control transmittance of light passing through the liquid crystal layer, and thereby display an image.

A liquid crystal display with a vertically aligned mode in which long axes of the liquid crystal molecules are arranged perpendicular to the upper and lower display panels in a state in which an electric field is not applied, has a high contrast ratio and easily implements a wide reference viewing angle.

Meanwhile, in order to make increase the response speed of the liquid crystals while implementing a wide viewing angle, a liquid crystal display including liquid crystals having a pretilt in a state in which the electric field is not applied, has been developed.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a liquid crystal display with improved panel reliability through a polymer film having high hardness.

An exemplary embodiment of the present invention provides a liquid crystal display including: a first substrate; a second substrate overlapping the first substrate; a liquid crystal layer between the first substrate and the second substrate and including liquid crystal molecules; and a plurality of protrusions between the first substrate and the liquid crystal layer, between the second substrate and the liquid crystal layer, or a combination thereof, and the plurality of protrusions includes a polymer of a compound represented by Formula 1.

Formula 1

Herein, $A_1$ and $A_2$ are independently —H, —OH, wherein $A_1$ and $A_2$ are not both —H, $P_1$ and $P_2$ are independently n and m are respectively an integer between 1 and 12, and n is less than m.

The compound of Formula 1 may be a compound represented by Formula 2.

Formula 2

Herein, $A_1$ and $A_2$ are independently —H, —OH, wherein $A_1$ and $A_2$ are not both —H, n and m are independently an integer between 1 and 12, and n is less than m.

The compound of Formula 1 may be a compound represented by Formula 3.

Formula 3

Herein, $P_1$ and $P_2$ are independently n and m are independently an integer between 1 and 12, and n is less than m.

The compound of Formula 1 may be a compound represented by Formula 1-1.

Formula 1-1

The plurality of protrusions may be between the first substrate and the liquid crystal layer and between the second substrate and the liquid crystal layer.

An alignment layer may not be present between the first substrate and the plurality of protrusions and between the second substrate and the plurality of protrusions.

The liquid crystal display may include a first electrode between the first substrate and the liquid crystal layer, and a second electrode between the second substrate and the liquid crystal layer, and wherein the plurality of protrusions may be between the first electrode and the liquid crystal layer, between the second substrate and the second electrode, or a combination thereof.

The plurality of protrusions may be between the first substrate and the liquid crystal layer, and an alignment layer may be between the second substrate and the liquid crystal layer.

The liquid crystal display may be a curved liquid crystal layer.

The plurality of protrusions may be between the alignment layer and the liquid crystal layer, and a number of the plurality of protrusions between the first substrate and the liquid crystal layer may be greater than a number of the plurality of protrusions between the alignment layer and the liquid crystal layer.

The liquid crystal layer may not include a reactive mesogen.

The liquid crystal layer may include the compound represented by Formula 1.

According to the exemplary embodiments, the liquid crystal display with improved panel reliability through the polymer film with high hardness is provided.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

The size and thickness of each configuration shown in the drawings are arbitrarily shown for better understanding and ease of description, and the present invention is not limited thereto. In the drawings, the thickness of layers, films, panels, regions, etc., are exaggerated for clarity. For better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. The word "on" or "above" means positioned on or below the object portion, and does not necessarily mean positioned on the upper side of the object portion based on a gravitational direction.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. Unless explicitly described to the contrary, the word "comprise" and variations such as "comprises" or "comprising" will be understood to imply the inclusion of stated elements but not the exclusion of any other elements.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The phrase "on a plane" means a view from a position above the object (e.g., from the top), and the phrase "on a cross-section" means a view of a cross-section of the object which is vertically cut from the side.

A liquid crystal display according to an exemplary embodiment will now be described with reference to accompanying drawings.

Figure 1:
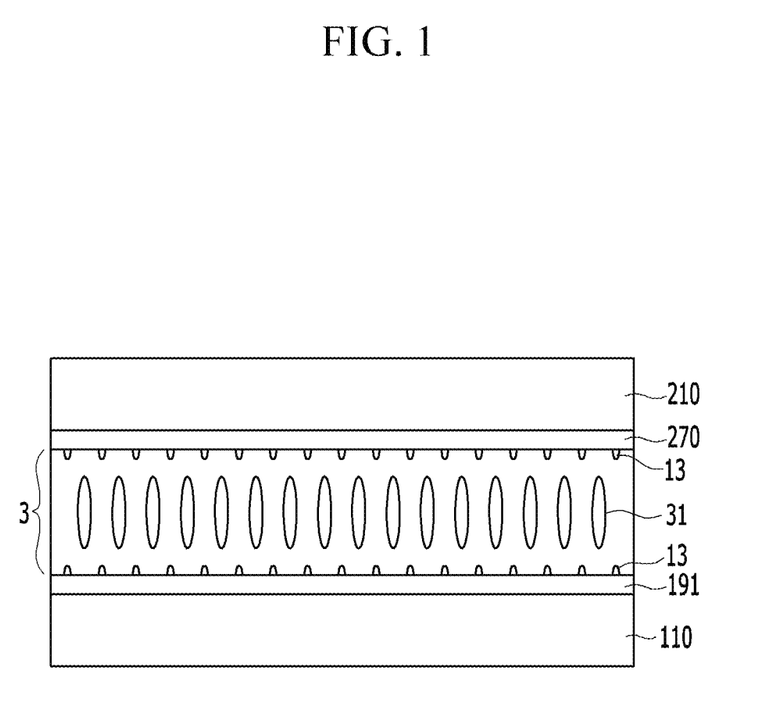
FIG. 1 is a cross-sectional view of a liquid crystal display according to an exemplary embodiment.

FIG. 1 is a view of a cross-section of a liquid crystal display according to an exemplary embodiment.

Referring to FIG. 1, the liquid crystal display includes a liquid crystal layer 3 including a plurality of liquid crystal molecules 31 between a first substrate 110 and a second substrate 210, a first electrode 191 between the first substrate 110 and the liquid crystal layer 3, and a second electrode 270 between the second substrate 210 and the liquid crystal layer 3. Further, the liquid crystal display includes a plurality of protrusions 13 between the first electrode 191 and the liquid crystal layer 3, between the second electrode 270 and the liquid crystal layer 3, or between the first electrode 191 and the liquid crystal layer 3 and between the second electrode 270 and the liquid crystal layer 3. While FIG. 1 shows an exemplary embodiment in which the plurality of protrusions 13 is disposed between the first electrode 191 and the liquid crystal layer 3 and between the second electrode 270 and the liquid crystal layer 3, the protrusions 13 may be disposed between the first electrode 191 and the liquid crystal layer 3 or may be disposed between the second electrode 270 and the liquid crystal layer 3.

The protrusions 13 include a polymer of a compound represented by Formula 1.

Formula 1

Herein, $A_1$ and $A_2$ are independently —H, —OH, wherein $A_1$ and $A_2$ are not both —H. That is, the configuration in which $A_1$ is —H and $A_2$ is —H is excluded.

Regarding the substituents for $A_1$ and $A_{-2}$, the portion represented by refers to a point of attachment of the substituent to the structure of Formula L With further regard to the substituents for $A_1$ and $A_{-2}$, however, a structural formula without an additional mark of signifies that the substituent may be attached to Formula 1 from any available position in the structural formula of the substituent, without limits. This is applicable to all of the present disclosure.

In Formula 1, $P_1$ and $P_2$ are independently where the n and m are independently an integer between 1 and 12, and n is less than m. Regarding $P_1$ and $P_2$, a portion marked with refers to a point of attachment of the substituent to the structure of Formula 1. This is applicable to all other parts of the present disclosure.

Regarding the compound represented by Formula 1, the $A_1$ and $A_2$ are chemically attached to a material included in the first electrode 190 or the second electrode 270 to connect the compound represented by Formula 1 and the substrate. In detail, the first electrode 191 provided between the first substrate 110 and the liquid crystal layer 3 may be chemically bonded to the $A_1$ group, the $A_2$ group, or a combination thereof. In a like manner, the second electrode 270 between the second substrate 210 and the liquid crystal layer 3 may be chemically bonded to the $A_1$ group, the $A_2$ group, or a combination thereof.

The structural formulae included in $A_1$ and $A_2$ include oxygen atoms, nitrogen atoms, hydrogen atoms, or a combination thereof, and the oxygen, nitrogen, and/or hydrogen atoms are hydrogen-bonded to the oxygen and/or hydrogen atoms included in the first electrode 191. This is also applicable to the case of the second electrode 270.

Further, regarding the compound represented by Formula 1, the $P_1$ and $P_2$ groups are photo-reactive groups that are polymerized by photo-irradiation. The methacrylate group present in $P_1$ and $P_2$ is photopolymerized with a neighboring $P_1$ or $P_2$ during the process of photo-irradiation to form a polymer. Accordingly, a protrusion 13 as shown in FIG. 1 is formed by photopolymerization of the compound represented by Formula 1.

Referring to Formula 1, the compound represented by Formula 1 includes the photo-reactive groups $P_1$ and $P_2$ so that one compound includes two photo-reactive groups, and the lengths of the carbon chains to which $P_1$ and $P_2$ are connected are different. That is, n is less than m in Formula 1, so the carbon chain to which $P_1$ is attached is shorter than the carbon chain to which $P_2$ is attached. Without being limited by theory, as a result of having this structure, the portions for the photo-reactive groups to react with each other become various, so the photopolymerization reaction may become firmer. That is, rather than a photopolymerization reaction being generated between the photo-reactive groups at only one end of the compound, the two ends of the compound represented by Formula 1 have different lengths, and the ends having different lengths generate a photopolymerization reaction product. Therefore, the portion where the photopolymerization reaction is substantially generated extends to one edge P2 and the middle region P1 of Formula 1, so the polymer resulting from the photopolymerization reaction may be formed more firmly.

The liquid crystal display which includes a photopolymerized protrusion 13 including the compound represented by Formula 1, does not need an additional alignment layer or a reactive mesogen. That is, a pre-tilt may be formed in the liquid crystal molecules in the absence of an alignment layer. This is because a pre-tilt is formed in the adjacent liquid crystal molecules 31 when the compound of Formula 1 is photopolymerized to form the protrusion 13. Therefore, in the absence of a voltage (i.e., a voltage is not applied to the liquid crystal display), the liquid crystal molecules 31 provided near the protrusion 13 may be at an incline with respect to the direction that is perpendicular to the first substrate 110, when the protrusion 13 is formed. When the liquid crystal molecules 31 have a pre-tilt as described above and the voltage is then applied, the liquid crystal molecules 31 may quickly rotate because of the pre-tilt of the liquid crystal molecules 31, and a response speed of the liquid crystal display becomes fast. Therefore, a liquid crystal display having a fast response speed and excellent afterimage characteristics may be provided. Further, the compound of Formula 1 represents a compound having a structure designed for inducing vertical alignment of the liquid crystal molecules, and as a result, the compound of Formula 1 may induce vertical alignment of the liquid crystal molecules and form a pre-tilt.

In addition, the compound of Formula 1 includes two photo-reactive groups such as $P_1$ and $P_2$, so the addition of a reactive mesogen is not needed. The reactive mesogen is a material having a photo-reactive group such as a methacrylate group, and will undergo photopolymerization during photo-irradiation. However, since the compound of Formula 1 includes a photo-reactive group such as the $P_1$ and $P_2$ groups, the photopolymerization reaction may be generated without adding a reactive mesogen, and a pre-tilt may be formed on the liquid crystal molecules 31.

FIG. 1 shows a plurality of protrusions 13 provided between the first electrode 191 and the liquid crystal layer 3 and between the second electrode 270 and the liquid crystal layer 3, and thus, the protrusions 13 may be formed between the first electrode 190 and the liquid crystal layer 3.

Figure 2:
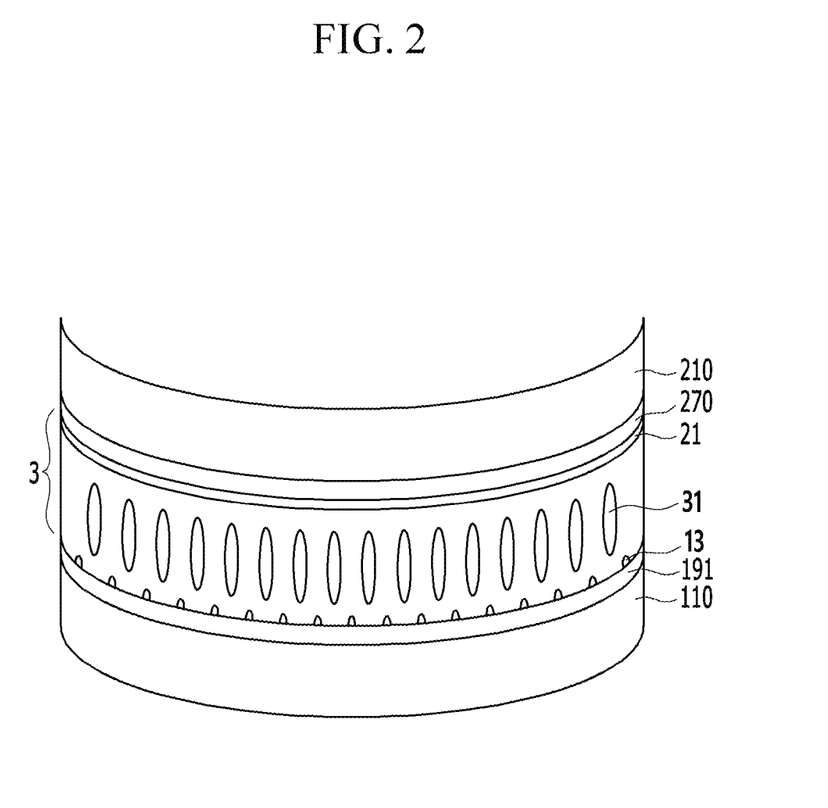
FIG. 2 is a cross-sectional view of a liquid crystal display according to another exemplary embodiment.

FIG. 2 is a cross-sectional view of a liquid crystal display according to another exemplary embodiment. Referring to FIG. 2, the liquid crystal display includes a plurality of protrusions 13 between the first electrode 191 and the liquid crystal layer 3, and an alignment layer 21 between the second electrode 270 and the liquid crystal layer 3. The description on the protrusion 13 corresponds to that described with reference to FIG. 1. That is, the protrusion 13 may include a polymer generated by polymerizing the compound represented by Formula 1.

The liquid crystal display according to an exemplary embodiment of FIG. 2 may be a curved display device. In the case of the curved display device, when the liquid crystal molecules provided near the first substrate 110 and the second substrate 210 have a pretilt, stains may be generated due to a misalignment of the first substrate 110 and the second substrate 210.

Therefore, regarding the curved liquid crystal display, it is desirable for the pre-tilt to be formed on the liquid crystal molecules provided near one of the first substrate 110 and the second substrate 210, and to not be formed on the liquid crystal molecules provided near the other substrate.

Therefore, regarding the liquid crystal display according to the exemplary embodiment of FIG. 2, a plurality of protrusions 13 are formed between the first electrode 191 and the liquid crystal layer 3, and the pre-tilt is thus formed on the liquid crystal molecules adjacent to the plurality of protrusions 13. However, the plurality of protrusions 13 is not formed between the second electrode 270 and the liquid crystal layer 3, and instead the vertical alignment layer 21 is provided therebetween, so the pre-tilt is not formed on the liquid crystal molecules provided near (adjacent) to the alignment layer 21.

The liquid crystal display having the structure shown in FIG. 2 may be manufactured by forming an alignment layer 21 between the second electrode 270 and the liquid crystal layer 3, forming a liquid crystal layer 3 including the compound represented by Formula 1 and the liquid crystal molecules between the first electrode 191 and the second electrode 270, inducing a photopolymerization reaction of the compound represented by Formula 1, and generating the protrusions. The alignment layer 21 is formed between the second electrode 270 and the liquid crystal layer 3 before forming the liquid crystal layer 3 including the compound represented by Formula 1 and the liquid crystal molecules. In this instance, a bonding force between the compound represented by Formula 1 and the alignment layer 21 is weak and a bonding force between the compound represented by Formula 1 and the first electrode 191 is stronger, so the compound represented by Formula 1 is more tightly bonded to the first electrode 191 than to the alignment layer 21, and is polymerized to form a protrusion by a reaction between the photo-reactive groups $P_1$ and $P_2$ of adjacent compounds represented by Formula 1. Therefore, the number of protrusions 13 formed between the first electrode 191 and the liquid crystal layer 3 may be significantly greater than the number of protrusions formed between the second electrode 270 and the liquid crystal layer 3.

Figure 3:
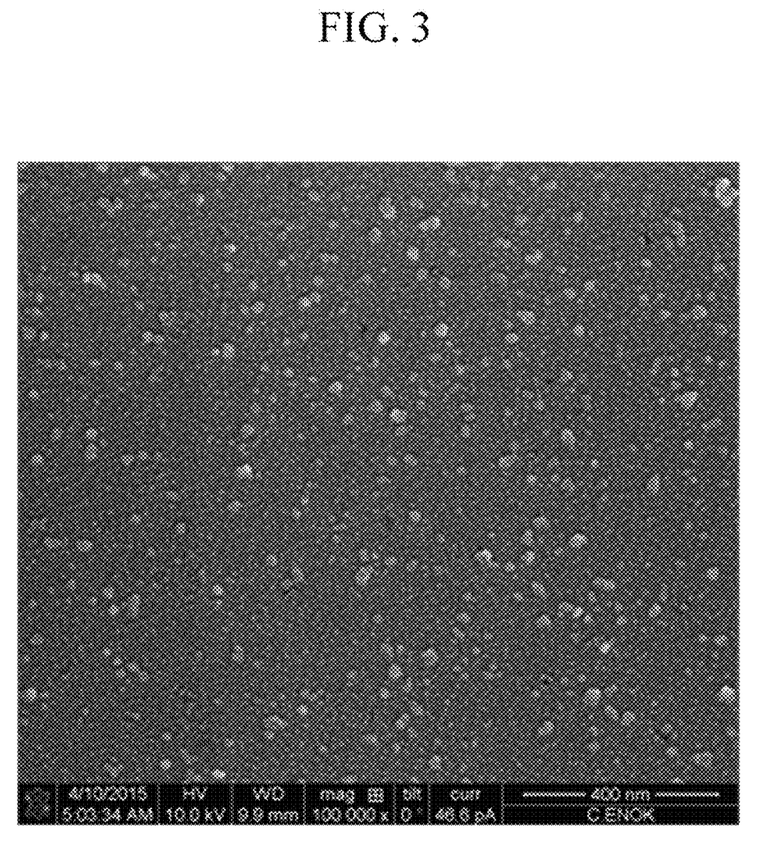
FIG. 3 is a scanning electron microscope (SEM) image of a plurality of protrusions formed on a first electrode in a liquid crystal display having the configuration shown in FIG. 2.
Figure 4:
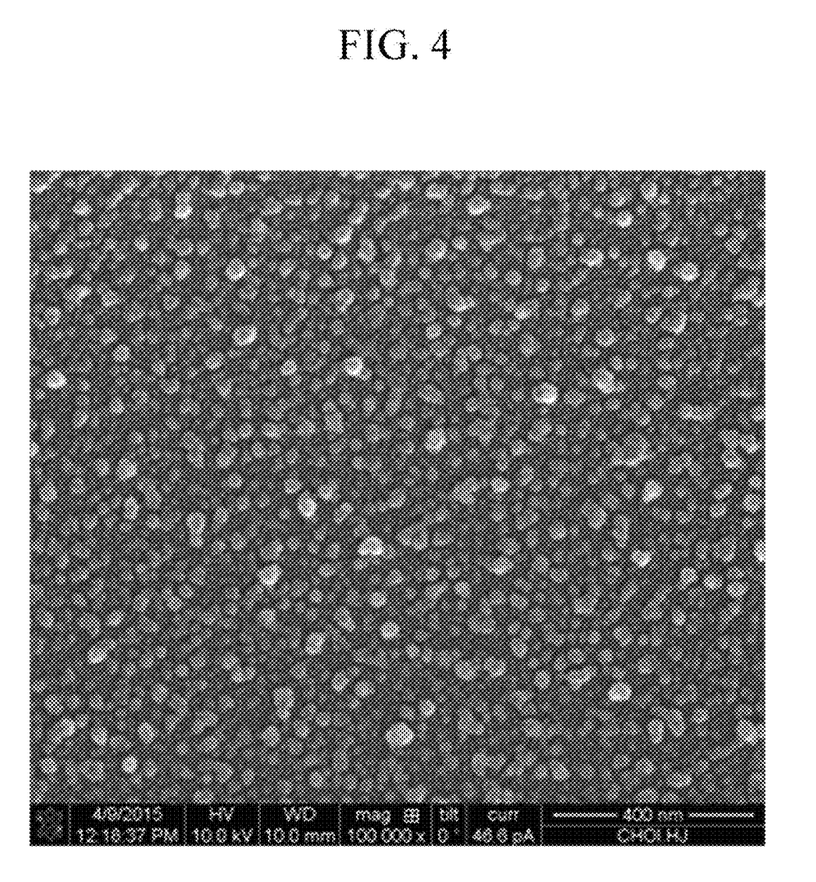
FIG. 4 is scanning electron microscope (SEM) image of a plurality of protrusions formed on a second electrode in a liquid crystal display having the configuration shown in FIG. 2.

FIG. 3 and FIG. 4 are scanning electron microscope (SEM) images of a protrusion formed on a liquid crystal display having the configuration shown in FIG. 2.

FIG. 3 is an SEM image in which a relatively small number of a plurality of protrusions are formed between the second electrode and the liquid crystal layer, and FIG. 4 is an SEM image in which a relatively greater number of a plurality of protrusions are formed between the first electrode and the liquid crystal layer. Referring to FIG. 3 and FIG. 4, it can be seen that very few protrusions are formed between the second electrode, on which the alignment layer is disposed, and the liquid crystal layer, and numerous protrusions are formed between the first electrode, which does not include the alignment layer, and the liquid crystal layer.

That is, the polymer of the compound represented by Formula 1 has high selectivity for photopolymerization on the electrode, and as a result, the protrusion may be selectively formed on the first electrode 191 or the second electrode 270 according to the user's intention.

The liquid crystal display including protrusions composed of the polymer of the compound represented by Formula 1, may include a pre-tilt in the liquid crystal molecules without an the presence of an additional alignment layer or the addition of a reactive mesogen. In addition, when the alignment layer is formed on first substrate or the second substrate and the protrusions including the polymer of the compound represented by Formula 1 are formed on the substrate without the alignment layer, a problem caused by a misalignment may be prevented in the curved display device.

The compound of Formula 1 may be a compound represented by Formula 2.

Formula 2

Herein, $A_1$ and $A_2$ are independently —H or —OH, wherein

$A_1$ and $A_2$ are not both —H, n and m are independently an integer between 1 and 12, and n is less than m.

Further, the compound of Formula 1 may be a compound represented by Formula 3.

Formula 3

Herein, $P_1$ and $P_2$ are independently n and m are independently an integer between 1 and 12, and n is less than m.

In detail, the compound of Formula 1 may be a compound represented by Formula 1-1.

Formula 1-1

The compound represented by Formula 1-1 may be prepared based on the reaction scheme provided below. However, this is an example and the method of preparing the compound represented by Formula 1-1 is not limited thereto.

Figure 5:
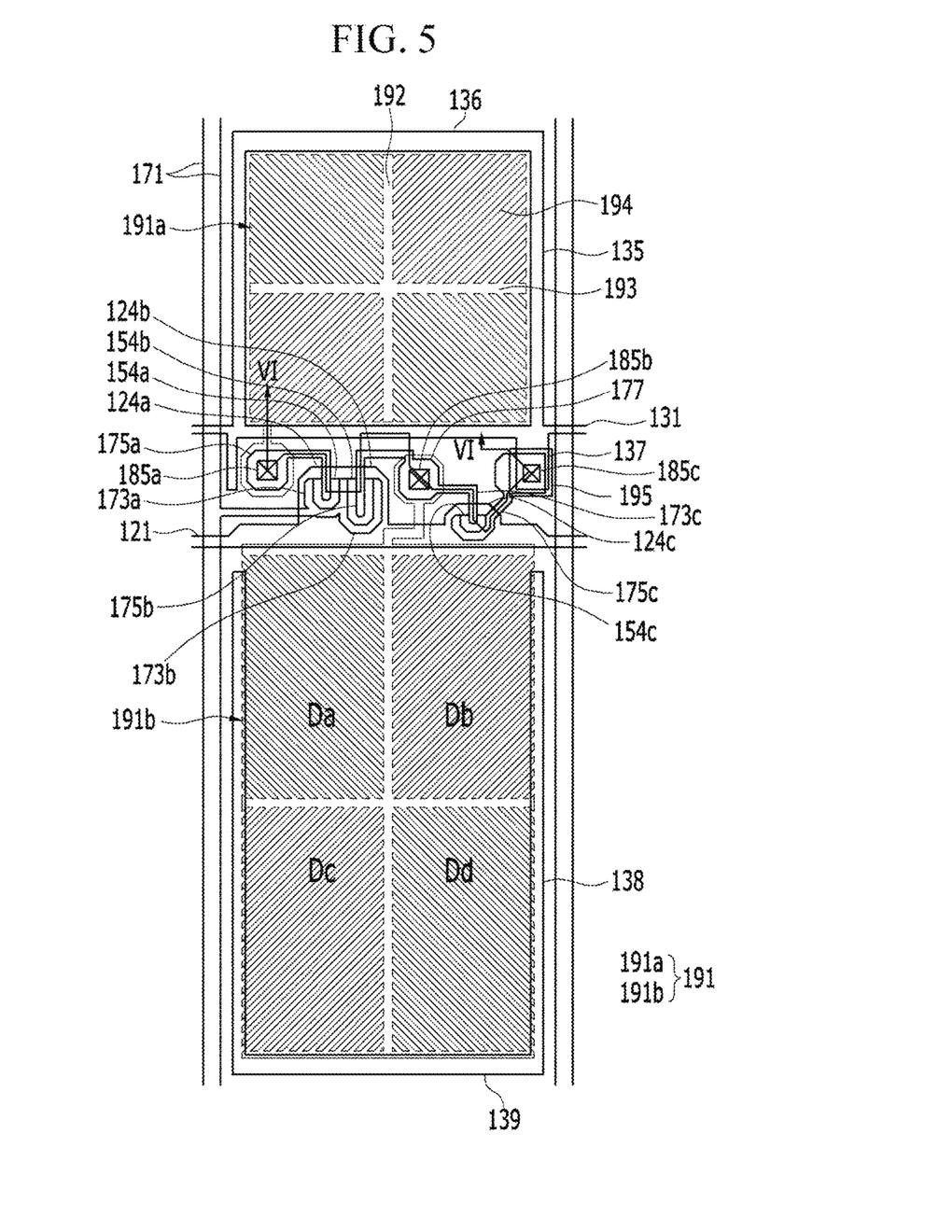
FIG. 5 is a plan view of a pixel of a liquid crystal display according to an exemplary embodiment.
Figure 6:
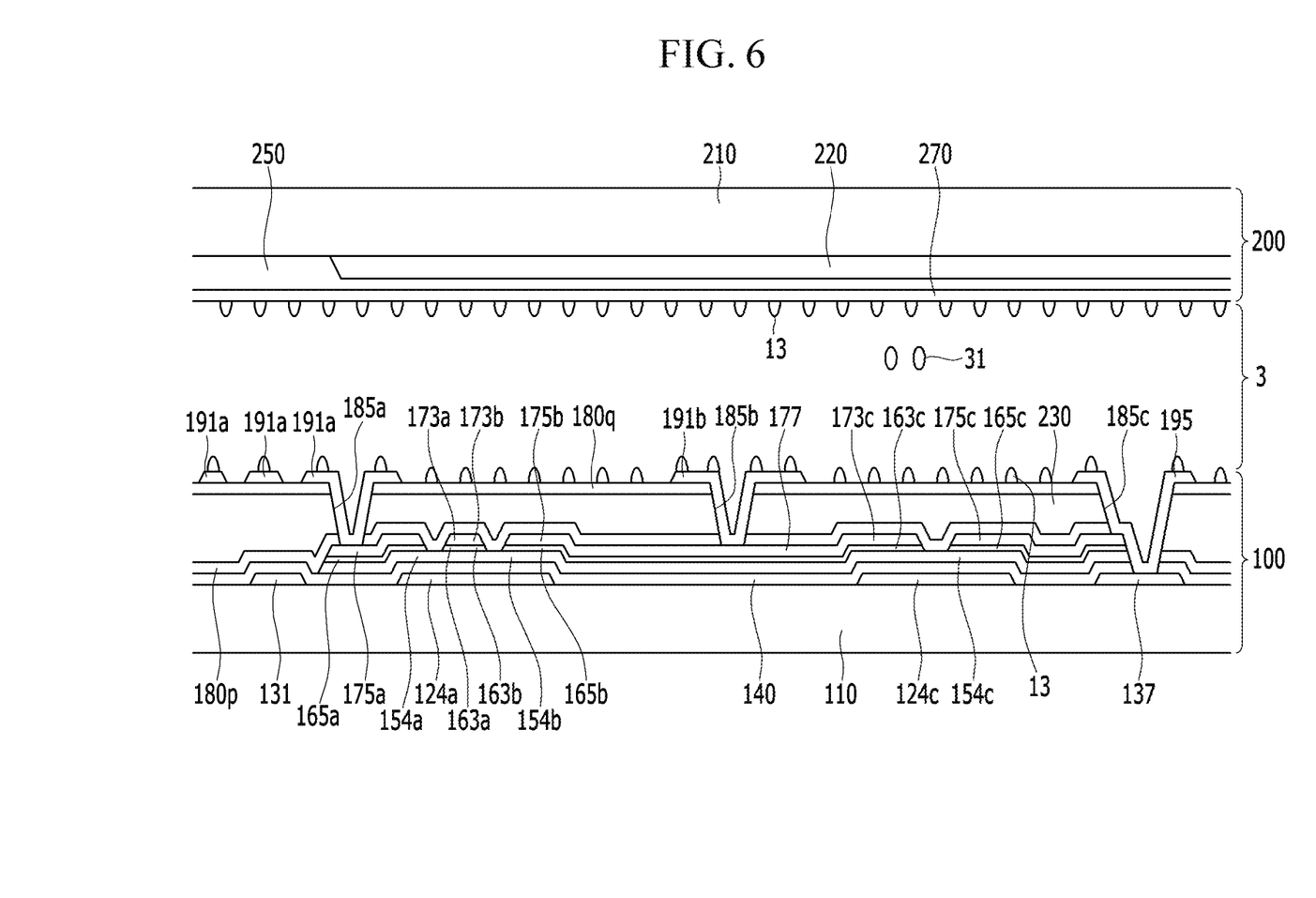
FIG. 6 is a cross-sectional view with respect to line VI-VI in FIG. 5.

FIG. 5 shows a plan view of a pixel of a liquid crystal display according to an exemplary embodiment, and FIG. 6 is a cross-sectional view with respect to line VI-VI in FIG. 5.

The focus of the present disclosure as it relates to the compound represented by Formula 1 and the corresponding protrusions including the polymer of the compound, has been described, and a structure of the liquid crystal display in which the plurality of protrusions 13 is actually applied will now be described in detail.

However, the structure of the liquid crystal display described according to the present exemplary embodiment is exemplary, and the present invention is not limited to the pixel structure to be described. That is, the protrusion including the polymer of the compound represented by Formula 1 may be applied to a display device having a structure in which the first electrode is provided on the first substrate and the second electrode is provided on the second substrate.

A liquid crystal display according to an exemplary embodiment will now be described.

A first display panel 100 will now be described.

A gate conductor including a gate line 121 and a division reference voltage line 131 is provided on a first substrate 110 made of transparent glass or plastic.

The gate line 121 includes a first gate electrode 124a, a second gate electrode 124b, and a third gate electrode 124c.

The division reference voltage line 131 includes first storage electrodes 135 and 136 and a reference electrode 137. Although not connected to the division reference voltage line 131, second storage electrodes 138 and 139 may be provided to overlap a second sub-pixel electrode 191b.

A gate insulating layer 140 is provided on the gate line 121 and the division reference voltage line 131.

A first semiconductor layer 154a, a second semiconductor layer 154b, and a third semiconductor layer 154c are provided on the gate insulating layer 140. Ohmic contacts 163a, 165a, 163b, 165b, 163c, and 165c are provided on the semiconductor layers 154a, 154b, and 154c.

A data conductor including a data line 171 connected to a first source electrode 173a and a second source electrode 173b, a first drain electrode 175a, a second drain electrode 175b, a third source electrode 173c, and a third drain electrode 175c, is provided on the ohmic contacts 163a, 165a, 163b, 165b, 163c, and 165c and the gate insulating layer 140

The first gate electrode 124a, the first source electrode 173a, and the first drain electrode 175a configure a first thin film transistor together with the first semiconductor layer 154a The second gate electrode 124b, the second source electrode 173b, and the second drain electrode 175b configure a second thin film transistor together with the second semiconductor layer 154b. The third gate electrode 124c, the third source electrode 173c, and the third drain electrode 175c configure a third thin film transistor together with the third semiconductor layer 154c.

The second drain electrode 175b is connected to the third source electrode 173c and includes an extension 177 extending to be wide.

A first passivation layer 180p is provided on the data conductors 171, 173c, 175a, 175b, and 175c and the semiconductor layers 154a, 154b, and 154c.

A color filter 230 is provided on the first passivation layer 180p. The color filter 230 extends in a vertical direction along two data lines 171 provided near each other. An exemplary embodiment has been described in the case in which the color filter 230 is included in the first display panel 100, and without being limited to this, the color filter 230 may be included in a second display panel 200.

A second passivation layer 180q is provided on the color filter 230. The first passivation layer 180p and the second passivation layer 180q may include an inorganic insulating layer such as a silicon nitride or a silicon oxide.

The second passivation layer 180q prevents the color filter 230 from lifting off of the first passivation layer, and controls contamination of the liquid crystal layer 300 which is caused by an organic material such as a solvent input from the color filter 230, thereby preventing defects such as an afterimage that may be caused when a screen is driven.

The first passivation layer 180p and the second passivation layer 180q include a first contact hole 185a and a second contact hole 185b overlapping the first drain electrode 175a and the second drain electrode 175b, respectively.

The first passivation layer 180p, the second passivation layer 180q, and the gate insulating layer 140 include a third contact hole 185c overlapping part of the reference electrode 137 and part of the third drain electrode 175c, and the third contact hole 185c is covered by a connecting member 195. The connecting member 195 electrically connects the reference electrode 137 overlapping the third contact hole 185c and the third drain electrode 175c.

The first electrode 191 is provided on the second passivation layer 180q. The first electrode 191 is one of field generating electrodes, and the first electrode 191 may be a pixel electrode. The first electrode 191 includes a first sub-pixel electrode 191a and the second sub-pixel electrode 191b that are separated from each other with a gate line 121 therebetween and neighbor each other in a column direction with respect to the gate line 121.

The first electrode 191 may include a transparent material such as an indium tin oxide (ITO) and an indium zinc oxide (IZO).

The first sub-pixel electrode 191a and the second sub-pixel electrode 191b are quadrangular and respectively include a cross-shaped stem including a horizontal stem 193 and a vertical stem 192 crossing the horizontal stem 193. Further, the first sub-pixel electrode 191a and the second sub-pixel electrode 191b are respectively divided into a first sub-region (Da), a second sub-region (Db), a third sub-region (Dc), and a fourth sub-region (Dd) by the horizontal stem 193 and the vertical stem 192, and they include a plurality of fine branches 194 provided on the respective sub-regions (Da-Dd).

The first sub-pixel electrode 191a and the second sub-pixel electrode 191b are respectively connected to the first drain electrode 175a and the second drain electrode 175b through the first contact hole 185a and the second contact hole 185b, and receive a data voltage from the first drain electrode 175a and the second drain electrode 175b. In this instance, part of the data voltage applied to the second drain electrode 175b is divided through the third source electrode 173c, so the voltage applied to the first sub-pixel electrode 191a becomes greater than the voltage applied to the second sub-pixel electrode 191b.

The first sub-pixel electrode 191a and the second sub-pixel electrode 191b to which the data voltage is applied, generate an electric field together with the second electrode 270 of the second display panel 200, thereby determining an alignment direction of liquid crystal molecules 31 of the liquid crystal layer 3 between the two electrodes 191 and 270. The luminance of light passing through the liquid crystal layer 3 changes according to the determined alignment direction of the liquid crystal molecules 31.

The above description regarding the thin film transistor and the first electrode 191 is an example, and the structure of the thin film transistor and the design of the first electrode 191 may be modified as desired so as to improve lateral visibility.

A protrusion 13 is provided between the first electrode 191 and the liquid crystal layer 3. The protrusion 13 corresponds to the protrusion 13 described with reference to FIG. 1. That is, the protrusion 13 includes a polymer generated by polymerizing the compound represented by Formula 1.

The second display panel 200 will now be described.

The second substrate 210 is provided to overlap the first substrate 110 in a separate manner. A light blocking member 220 is provided between the second substrate 210 and the liquid crystal layer 3. The light blocking member 220 is provided on the second display panel 200 so as to overlap the region in which the data line 171 of the first display panel 100 is provided and the region in which the thin film transistor is provided. The present specification has described and shown an exemplary embodiment in which the light blocking member 220 is included in the second display panel 200, however, the position of the light blocking member is not limited thereto, and the light blocking member may be included in the first display panel 100.

An overcoat 250 is provided between the light blocking member 220 and the liquid crystal layer 3. The overcoat 250 may be omitted as desired.

The second electrode 270, which is one of field generating electrodes, is provided between the overcoat 250 and the liquid crystal layer 3. The second electrode 270 determines the direction of the liquid crystal molecules 31 of the liquid crystal layer 3 by generating an electric field together with the first electrode 191 of the first display panel 100. The second electrode 270 may be a common electrode.

The protrusion 13 is provided between the second electrode 270 and the liquid crystal layer 3, and the protrusion 13 corresponds to the description provided with reference to FIG. 1. That is, the protrusion 13 includes a polymer generated by polymerizing the compound expressed as Formula 1.

The liquid crystal layer 3 includes liquid crystal molecules 31. In this instance, the liquid crystal layer 3 may further include the compound represented by Formula 1 in an unreacted (unpolymerized) state. In the process for manufacturing a liquid crystal display according to the present exemplary embodiment, the compound expressed as Formula 1 is included in the liquid crystal layer and then is exposed to photoirradiation to form a polymer layer including a plurality of protrusions, and in this instance, a portion of the compound expressed as Formula 1 may not be polymerized and may remain as a monomer in the liquid crystal layer.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a first substrate;
   a second substrate overlapping the first substrate;
   a liquid crystal layer between the first substrate and the second substrate and comprising liquid crystal molecules; and
   a plurality of protrusions between the first substrate and the liquid crystal layer, between the second substrate and the liquid crystal layer, or a combination thereof, wherein
   the plurality of protrusions comprises a polymer of a compound represented by Formula 1:

Formula 1 wherein

$A_1$ and $A_2$ are independently —H, —OH, wherein $A_1$ and $A_2$ are not both —H,

$P_1$ and $P_2$ are independently n and m are independently an integer between 1 and 12, and n is less than m.

2. The liquid crystal display of claim 1, wherein the compound of Formula 1 is a compound represented by Formula 2:

Formula 2 wherein
A₁ and A₂ are independently —H, —OH, wherein A₁ and A₂ are not both —H, n and m are independently an integer between 1 and 12, and n is less than m.

3. The liquid crystal display of claim 1, wherein the compound of Formula 1 is a compound represented by Formula 3:

Formula 3 wherein P₁ and P₂ are independently n and m are independently an integer between 1 and 12, and n is less than m.

4. The liquid crystal display of claim 1, wherein the compound of Formula 1 is a compound represented by Formula 1-1:

Formula 1-1

5. The liquid crystal display of claim 1, wherein
the plurality of protrusions is between the first substrate and the liquid crystal layer and
between the second substrate and the liquid crystal layer.

6. The liquid crystal display of claim 5, wherein
an alignment layer is not present between the first substrate and the plurality of protrusions and between the second substrate and the plurality of protrusions.

7. The liquid crystal display of claim 1, wherein the liquid crystal display comprises:
a first electrode between the first substrate and the liquid crystal layer, and
a second electrode between the second substrate and the liquid crystal layer, and
wherein the plurality of protrusions is between the first electrode and the liquid crystal layer, between the second substrate and the second electrode, or a combination thereof.

8. The liquid crystal display of claim 1, wherein
the plurality of protrusions is between the first substrate and the liquid crystal layer, and
an alignment layer is between the second substrate and the liquid crystal layer.

9. The liquid crystal display of claim 8, wherein
the liquid crystal display is a curved liquid crystal display.

10. The liquid crystal display of claim 8, wherein
the plurality of protrusions is between the alignment layer and the liquid crystal layer, and
a number of the plurality of protrusions between the first substrate and the liquid crystal layer is greater than a number of the plurality of protrusions between the alignment layer and the liquid crystal layer.

11. The liquid crystal display of claim 1, wherein
the liquid crystal layer does not comprise a reactive mesogen.

12. The liquid crystal display of claim 1, wherein the liquid crystal layer comprises the compound represented by Formula 1.

* * * * *